(No Model.)

A. N. CLARK.
GUMMING TOOL FOR MENDING PNEUMATIC TIRES.

No. 559,120. Patented Apr. 28, 1896.

Witnesses

Inventor
Allison N. Clark
By James Shepard
Attys.

UNITED STATES PATENT OFFICE.

ALLISON N. CLARK, OF PLAINVILLE, CONNECTICUT.

GUMMING-TOOL FOR MENDING PNEUMATIC TIRES.

SPECIFICATION forming part of Letters Patent No. 559,120, dated April 28, 1896.

Application filed September 17, 1895. Serial No. 562,760. (No model.)

*To all whom it may concern:*

Be it known that I, ALLISON N. CLARK, a citizen of the United States, residing at Plainville, in the county of Hartford and State of Connecticut, have invented certain new and useful Improvements in Gumming-Tools for Mending Pneumatic Tires, of which the following is a specification.

My invention relates to improvements in gumming-tools for mending pneumatic tires; and the chief object of my improvement is to provide a tool for more conveniently applying gum to the rubber rivet-head closely to its shank.

Figure 1:
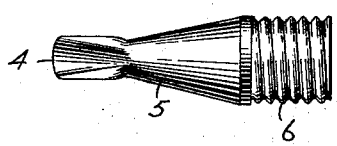
Figure 2:
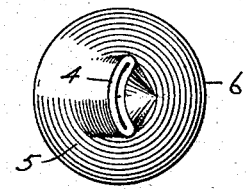
Figure 3:
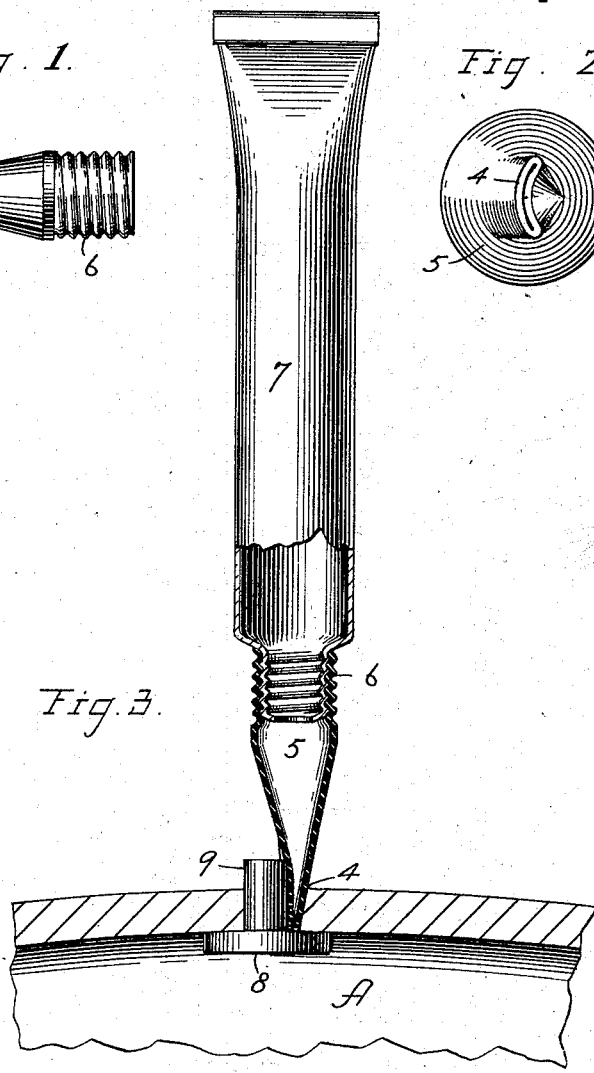

In the accompanying drawings, Figure 1 is a side elevation of my gumming-tool. Fig. 2 is an end view thereof. Fig. 3 is an enlarged sectional view of the same, together with a gum reservoir or receptacle, a portion of a pneumatic tire, and a rubber rivet, illustrating the manner of applying the gum.

The nozzle or delivery end 4 of my tool is convex on one side and concave on the other, with a curved delivery-opening, as seen in end view, between the metal which forms said two sides. I also prefer to make said end slightly rounded in side view, as shown in Fig. 1. This end portion may be first formed as a cylinder and then swaged to the shape shown. From the nozzle or end 4 is a rounded tapering portion 5, which connects said nozzle with the neck 6 for attachment to a lead tube 7 or other suitable reservoir.

The main feature of my tool is the delivery-nozzle, and I prefer to thread the neck so that it may be screwed upon the end of the ordinary compressible lead tubes 7, in which the repairing-gum is usually put up for sale; but the manner of securing the nozzle to the reservoir, or the kind of reservoir, or the manner of forcing the gum from the reservoir through the nozzle are matters which are not material to my invention.

A designates a portion of a rubber pneumatic tire which has been punctured and has the usual mending rubber rivet placed with its head 8 inside of the tire and its shank 9 in the hole therein. After thus adjusting the rivet the nozzle of the gumming-tool is inserted in the hole by the side of the rivet-shank with its concave side against said shank and its convex side against the side of the hole, whereby the hole is not greatly enlarged or stretched in applying the tool. The gum may now be forced through the nozzle in any proper manner, as by compressing slightly the lead tube, and then the tool may be moved along circumferentially of the rivet-shank and more gum forced out, and so on until the rivet-head is gummed entirely around said shank. The tool is then withdrawn and the rivet-head is pressed to the inside of the tire when refilled the same as in the ordinary process of mending such tires.

I claim as my invention—

The herein-described gumming-tool for mending rubber tires consisting of the nozzle, concave on one side and convex on the other with a curved delivery-orifice between said sides and means for connecting with a reservoir, substantially as described and for the purpose specified.

ALLISON N. CLARK.

Witnesses:
JAMES SHEPARD,
A. W. STIPEK.